US008128475B2

(12) United States Patent
Goss

(10) Patent No.: US 8,128,475 B2
(45) Date of Patent: Mar. 6, 2012

(54) APPARATUS AND METHOD FOR GENERATING A GRAPHICAL TRANSFORMATION OF AN INPUT NUMBER FOR USE IN A GAMING APPLICATION

(75) Inventor: Chris Goss, Winchester Hampshire (GB)

(73) Assignee: Ionoco Limited, London (GB)

( * ) Notice: Subject to any disclaimer, the term of this patent is extended or adjusted under 35 U.S.C. 154(b) by 1170 days.

(21) Appl. No.: 11/884,718

(22) PCT Filed: Feb. 21, 2006

(86) PCT No.: PCT/US2006/005997

§ 371 (c)(1), (2), (4) Date: Aug. 20, 2007

(87) PCT Pub. No.: WO2006/091549

PCT Pub. Date: Aug. 31, 2006

(65) Prior Publication Data

US 2008/0139275 A1 Jun. 12, 2008

Related U.S. Application Data

(60) Provisional application No. 60/655,737, filed on Feb. 22, 2005.

(51) Int. Cl.
*A63F 13/00* (2006.01)

(52) U.S. Cl. .......... 463/16; 463/42; 273/144; 273/144 B

(58) Field of Classification Search .................... 463/16, 463/42; 273/144, 144 B See application file for complete search history.

(56) References Cited

U.S. PATENT DOCUMENTS

| | | | | |
|---|---|---|---|---|
| 4,724,307 | A | 2/1988 | Dutton et al. | |
| 4,984,796 | A | 1/1991 | Peacock | |
| 5,048,833 | A | 9/1991 | Lamle | |
| 5,909,875 | A | 6/1999 | Weingardt | |
| 6,152,448 | A | 11/2000 | Cudlipp | |
| 6,183,361 | B1 | 2/2001 | Cummings et al. | |
| 6,322,071 | B1 | 11/2001 | Chaaban | |
| 6,428,413 | B1 * | 8/2002 | Carlson | 463/16 |
| 6,478,677 | B1 | 11/2002 | Moody | |
| 6,702,669 | B2 | 3/2004 | Moody | |
| 6,763,094 | B2 | 7/2004 | Conn et al. | |
| 6,783,456 | B2 | 8/2004 | White | |
| 7,367,885 | B2 * | 5/2008 | Escalera et al. | 463/32 |
| 7,572,186 | B2 * | 8/2009 | LeMay et al. | 463/32 |
| 7,878,894 | B2 * | 2/2011 | Tulley et al. | 463/17 |
| 2001/0013680 | A1 | 8/2001 | Chaaban | |
| 2002/0119815 | A1 | 8/2002 | Lyons | |
| 2002/0174444 | A1 | 11/2002 | Gatto et al. | |
| 2004/0259631 | A1 | 12/2004 | Katz et al. | |
| 2006/0025222 | A1 | 2/2006 | Sekine | |

* cited by examiner

*Primary Examiner* — Pierre Eddy Elisca
*Assistant Examiner* — Shahid Kamal
(74) *Attorney, Agent, or Firm* — BainwoodHuang

(57) ABSTRACT

One embodiment of the invention provides an apparatus and method for use in a gaming application. The apparatus comprises an input for receiving a non-predictable input number, K; and an output for presenting a graphical selector comprising N options. The graphical selector is configured to step in sequence through the N options in accordance with the received number K to select one of the N options. This therefore transforms the non-predictable input number K into a selection of an output option for use in the gaming application.

41 Claims, 12 Drawing Sheets

APPARATUS AND METHOD FOR GENERATING A GRAPHICAL TRANSFORMATION OF AN INPUT NUMBER FOR USE IN A GAMING APPLICATION

FIELD OF THE INVENTION

The present invention relates to a method and apparatus for generating a graphical transformation of an input number, such as might be used in a gaming application over the Internet or a mobile telephone network, and such-like.

BACKGROUND OF THE INVENTION

The last few years have seen a significant increase in on-line gaming, especially over the Internet. There are many sites that allow players to participate in games such as poker, roulette, blackjack, bingo and so on. The commercial success of such sites means that this is now a crowded marketplace, and accordingly sites are keen to find mechanisms to differentiate themselves from one another. One particular concern for on-line gaming businesses relates to the random generation of cards, roulette numbers, and so on. This random generation is generally done by a computer behind the scenes (in effect). Such a lack of transparency may dissuade players from participating in games if they have any doubts about the fairness or reliability of the random generation.

In addition, there has been increased coverage recently of real-life gaming events such as poker tournaments, especially as the amount of available television air-time grows rapidly with cable, satellite and digital television. The providers of such programming are interested in mechanisms to drive increased revenue from their shows.

SUMMARY OF THE INVENTION

Accordingly, one embodiment of the invention provides apparatus for use in a gaming application. The apparatus comprises an input for receiving a non-predictable input number, K and an output for presenting a graphical selector comprising N options. The graphical selector is configured to step in sequence through the N options in accordance with the received number K to select one of the N options. This transforms the non-predictable input number K into a selection of an output option for use in the gaming application.

The graphical selector operates in a manner that is random, in that without knowing the (unpredictable) input, it is not possible to predict the output selection. Furthermore, the selection is completely transparent, and hence can be seen to be fair. The selection is also visually appealing, and can be implemented as a real-time, animated graphic, for example on-line. Consequently, the result is readily accessible to all participants. In addition, the format of the resulting selection is very flexible, and can be varied greatly according to the particular needs of any given application and environment. This can be used to generate a wide range of interesting and attractive new games, and so stimulate greater participate in gaming web-sites.

In general, a succession of numbers is received at the input, and the selector selects or determines an option for each of the received numbers. The starting position for the graphical selector in the sequence of N options may be determined by the action of the graphical selector for the preceding number in the succession. For example, the new starting position may correspond to the previously selected output option. Alternatively, the starting position may be (re)set to a fixed location within the selector for each input number.

In some implementations, the positions or order of the N options within the selector may be randomised prior to receipt of the input number, thereby ensuring that each of the different options has the same likelihood of being selected. An alternative approach would be to randomise the starting position itself within the N options prior to selecting an output option. If a succession of numbers is being received, such randomisation of the option ordering and/or the starting position may be performed just once at the beginning of the succession of numbers, or repeatedly, before each individual number in the succession of numbers.

Multiple graphical selectors may be provided to operate in parallel with one another. This then allows multiple output options to be selected for each individual input number. Another possibility is to arrange multiple graphical selectors in a series or cascade configuration.

In one implementation, the graphical selector is presented for output over a computer network or as a television signal. One possibility is for an applet or similar functionality to be downloaded onto a mobile phone or client computer system to produce the graphical selector. Another possibility is for the selector to be provided as an ancillary to a television broadcast, for example over a digital television network.

In some implementations, the input number is derived from a primary game, such as bingo, cards or a casino game (e.g. poker, blackjack, roulette), and the selected output option is applied to a secondary game, which may also be based (for example) on bingo, cards or a casino game. Note that the secondary game may be the same as the primary game or may be different. The secondary game may be separate from the primary game or may be linked to it—for example, the secondary game may be based on a comparison or combination of the input number with the selected output option. A charge may be made for participating in the secondary game, or this may be available for free to encourage further participation in the primary game.

In some cases, the selected output option does not provide an additional game per se, but rather provides some other service relative to the primary game. For example, the selected output option may correspond to a potential reward provided by the primary gaming application.

Another embodiment of the invention provides a method for use in a gaming application. The method comprises receiving a non-predictable input number, K, and outputting a graphical selector comprising N options. The graphical selector is configured to step in sequence through the N options in accordance with the received number K to select one of the N options. This thereby transforms the non-predictable input number K into a selection of an output option for use in the gaming application.

Another embodiment of the invention provides a computer program product comprising machine instructions that when loaded into one or more machines implement such a method. The computer program product may be provided as a set of instructions recorded onto a physical medium, such as a CD, a DVD, and so on, or encoded into a transmission medium on a wireless or wired network such as the Internet. In either case, such instructions can then be loaded into a computer system for execution. It will be appreciated that the computer program product, along with the method embodiment, may utilise and benefit from the same particular features as described above in relation to the apparatus embodiment.

BRIEF DESCRIPTION OF THE DRAWINGS

Various embodiments of the invention will now be described in detail by way of example only with reference to the following drawings.

DETAILED DESCRIPTION

Figure 1:
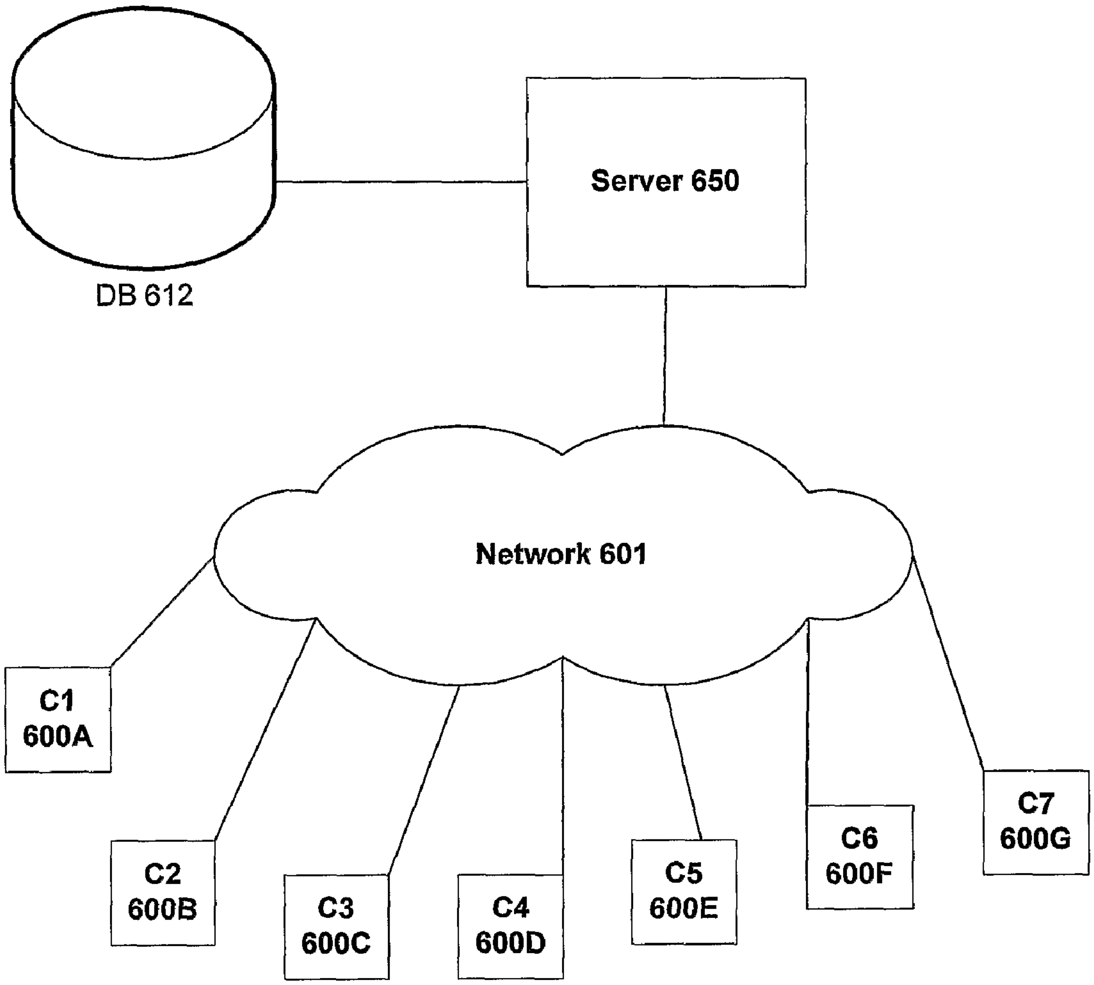
FIG. 1 illustrates in a generic form a system architecture for implementing the invention.

FIG. 1 is a generic diagram of a distributed system which may be used to implement various embodiments of the invention. The system includes a server 650 which is linked to a database 612. The server is further linked to a plurality of clients 600A, 600B, 600C, 600D, 600E, 600F, 600G by network 601. Network 601 may represent a computer network, such as the Internet, a mobile telephone network, a television network (digital, satellite, cable, etc), or any other appropriate wired and/or wireless data communications facility.

Server 650 may be linked to the network 601 via any suitable device. For example, if network 601 represents the Internet, then a web server (not shown in FIG. 1) may be interposed as required between server 650 and network 601. Likewise, if network 601 comprises a mobile telephone network, then server 650 may communicate with clients 600 via the network 601 using appropriate transmission and reception facilities.

Server 650 may be implemented with any suitable computer or combination of computers. Clients 600 may likewise be implemented using any suitable device with network connectivity and some graphical display facility, for example a personal computer, a laptop, a personal digital assistant (PDA), a workstation, a digital television set, a mobile (cellular) telephone, and so on. The clients may be pre-configured with appropriate software, or may download the appropriate software from the network 601, whether from server 650 or some other system. In some embodiments, server 650 may provide clients 600 with a Java applet or similar form of network program (Java is a trademark of Sun Microsystems Inc). Note that while FIG. 1 depicts seven clients linked to server 650, the number of clients so connected may be much higher—potentially hundreds, thousands, or millions.

A variety of clients 600 may be connected to server 650 over one or more different types of network. For example, clients C1, C2, C5 and C6 may be mobile telephones linked to server 650 over a mobile telephone network; clients C3 and C4 may be computer workstations linked to server 650 via the Internet; and client C7 may be a digital television set linked to server 650 via a television broadcast signal for downstream communications from server 650 to client C7 and via a telephone network for upstream communications from client C7 to server 650.

Figure 2A:
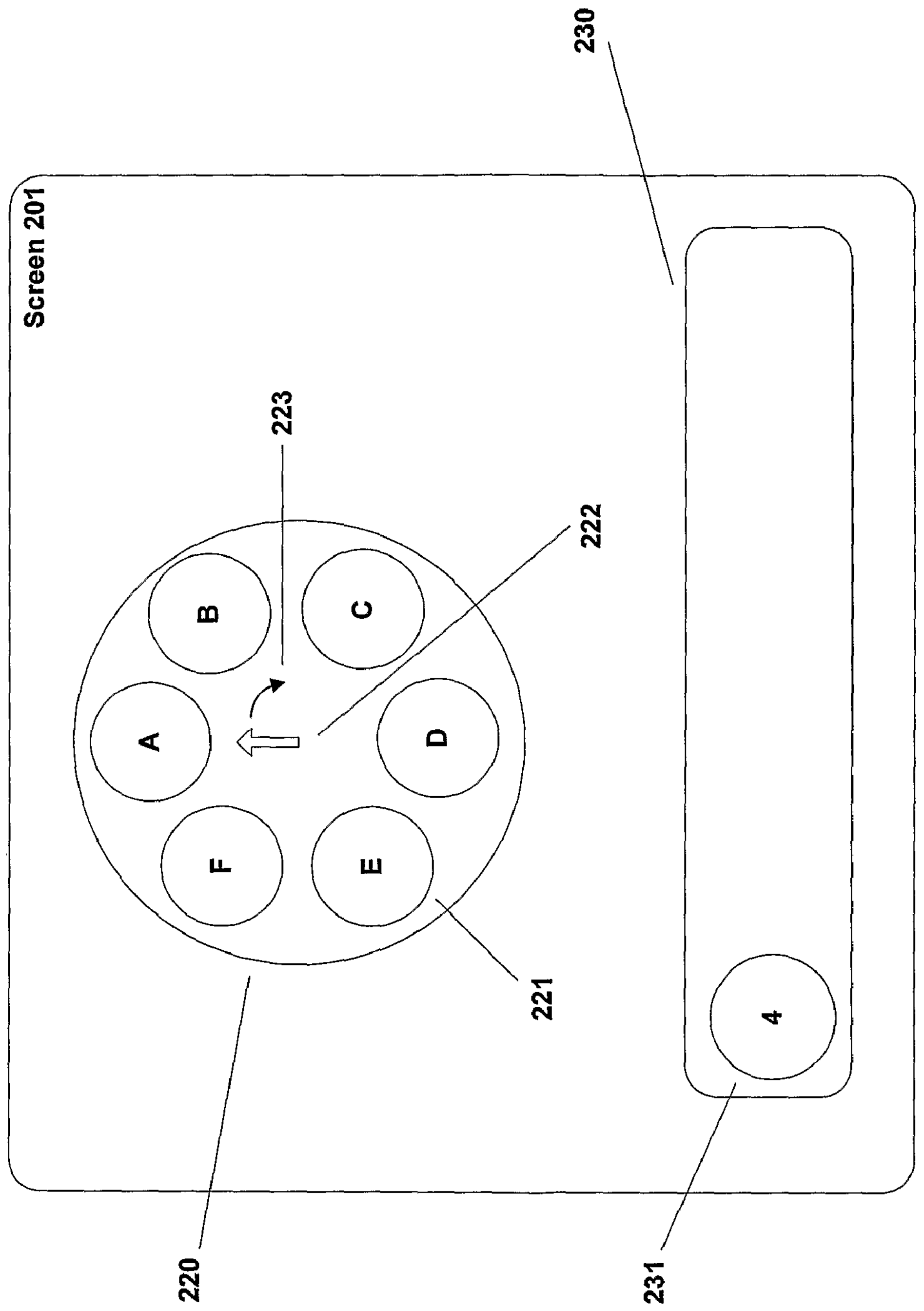
FIGS. 2A-2D show a sequence of screen images in accordance with one embodiment of the invention.

FIG. 2A illustrates screen 201 in accordance with one embodiment of the invention, including the graphics output from server 650. Screen 201 includes two main graphics components, namely graphic or cyclic selector 220 and number block 230. Number block 230 shows a set of one or more input numbers 231 (in FIG. 2A, it is assumed that input number 4 has so far been provided). Note that screen 201 may also depict other items, for example, some form of on-line gaming application. Another possibility is that screen 201 may also be used to show some television programming, for example a real-life poker tournament.

In the embodiment of FIG. 2A, the cyclic selector 220 is represented by a circular device. Evenly distributed around the perimeter of the cyclic selector are a number of options 221. Each option is represented by a ball 221, and in FIG. 2A the various options in the cyclic selector are schematically labelled by the letters A, B, C, D, E and F. (It will be appreciated that the options could correspond to different words, numbers, colours, playing cards, or any other appropriate categories, as discussed in more detail below). The inner portion of the cyclic selector 220 is occupied by a selection arrow or pointer 222, which rotates in the direction indicated by arrow 223. As selection arrow 222 rotates, it points at each option ball 221 in turn.

The amount that selection arrow 222 is rotated depends upon the input number 231 (the source of input number 231 will be described in more detail below). In particular, the selection arrow 222 is rotated by the number of spaces or units indicated by the most recently input number 231, as shown in number block 230. In the example of FIG. 2A, this input number is 4, and so the selection arrow 222 rotates 4 units around the cyclic selector.

For convenience we assume that the selection arrow 222 initially points upwards to the option ball denoted as "A" in FIG. 2A, and that the rotation is in the clockwise direction. Accordingly, the selection arrow 222 rotates 4 units around cyclic selector 220 in response to the arrival of input number 231, thereby arriving at option E. This brings us to the situation depicted in FIG. 2B, where arrow 222 now points to ball E. Note that option ball E has been visually modified in FIG. 2B (by hatching) in response to this selection, to provide a clear visual indication of its selection (or elimination).

Figure 2B:
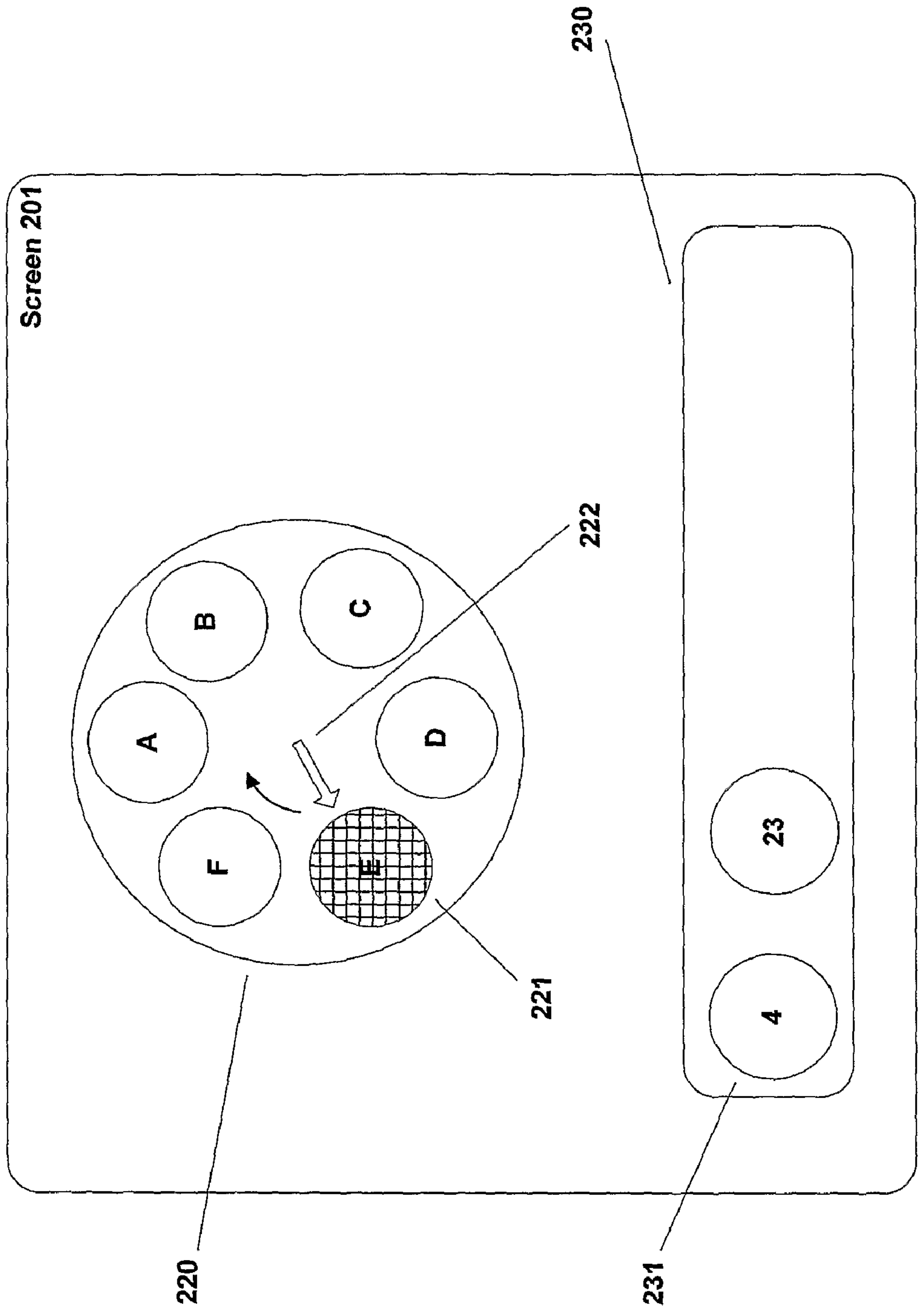

We now assume that a further input number 231 is provided, for example 23, as also shown in number block 230 of FIG. 2B. In response to this input number, the selection arrow 222 is again rotated in the clockwise direction, this time by 23 units. However, we now ignore option ball E in the counting, since it has been eliminated by its previous selection. It will be appreciated that since the input number (23) is greater than the number of unselected option balls remaining in the cyclic selector (5), the rotation will loop around the cyclic selector more than once. In fact, each complete rotation of selection arrow 222 around the remaining balls of cyclic selector 220 corresponds to five units, so that a rotation of twenty-three units takes us to option ball B (equal to four complete rotations of the cyclic selector, plus another three units). Note that in this rotation we started counting from the option ball immediately after the option ball that was selected by the previous input number (i.e. from option ball F), rather than returning to option ball A to start.

Figure 2C:
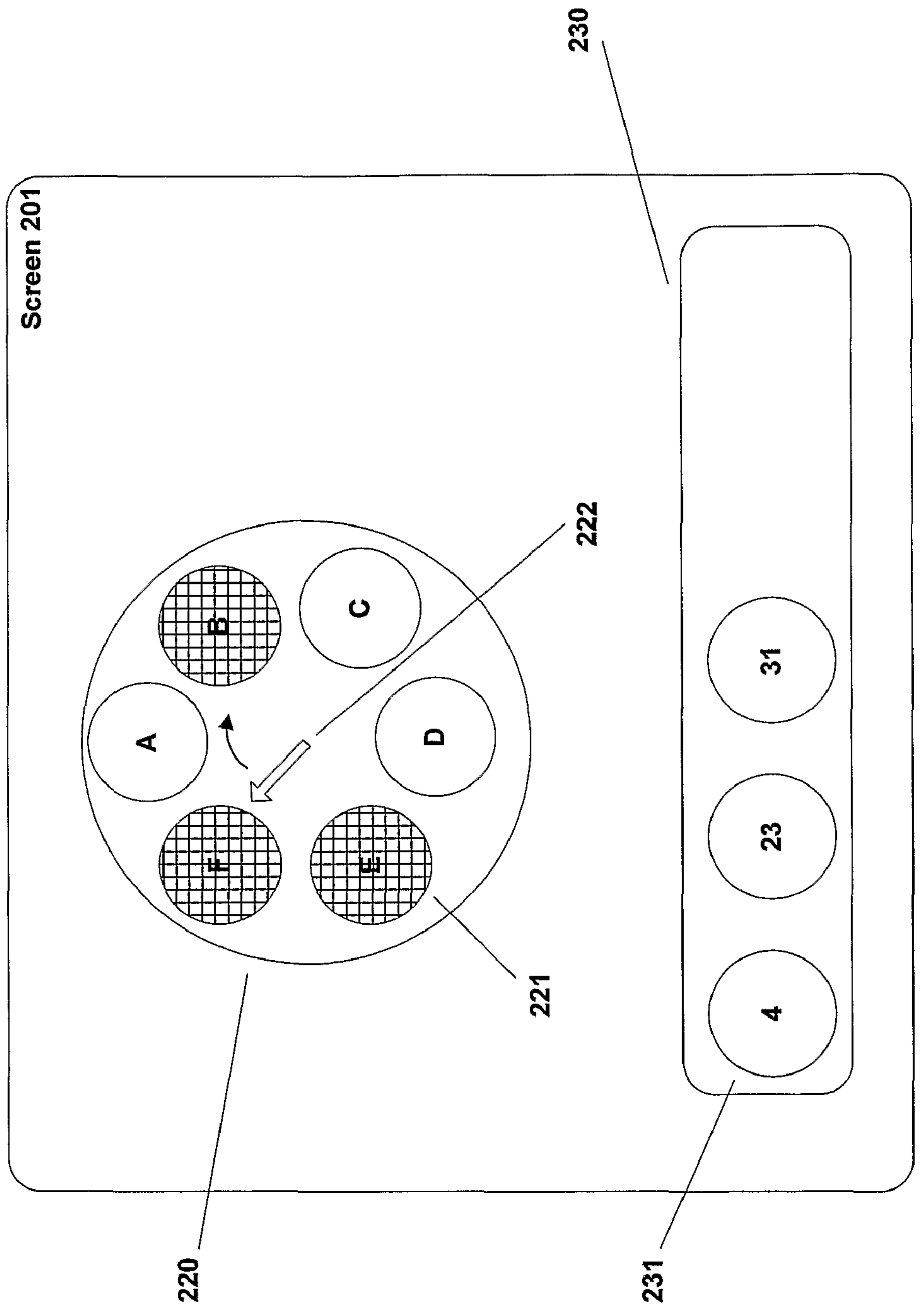

FIG. 2C illustrates the situation after three input numbers have been provided, namely 4 and 23 as already discussed, followed by input number 31. As previously described, the rotations for input numbers 4 and 23 eliminated option balls E and B respectively from the cyclic selector 220. In addition, the rotation for input number 31 eliminates option ball F, which is also shown as hatched in FIG. 2C.

Figure 2D:
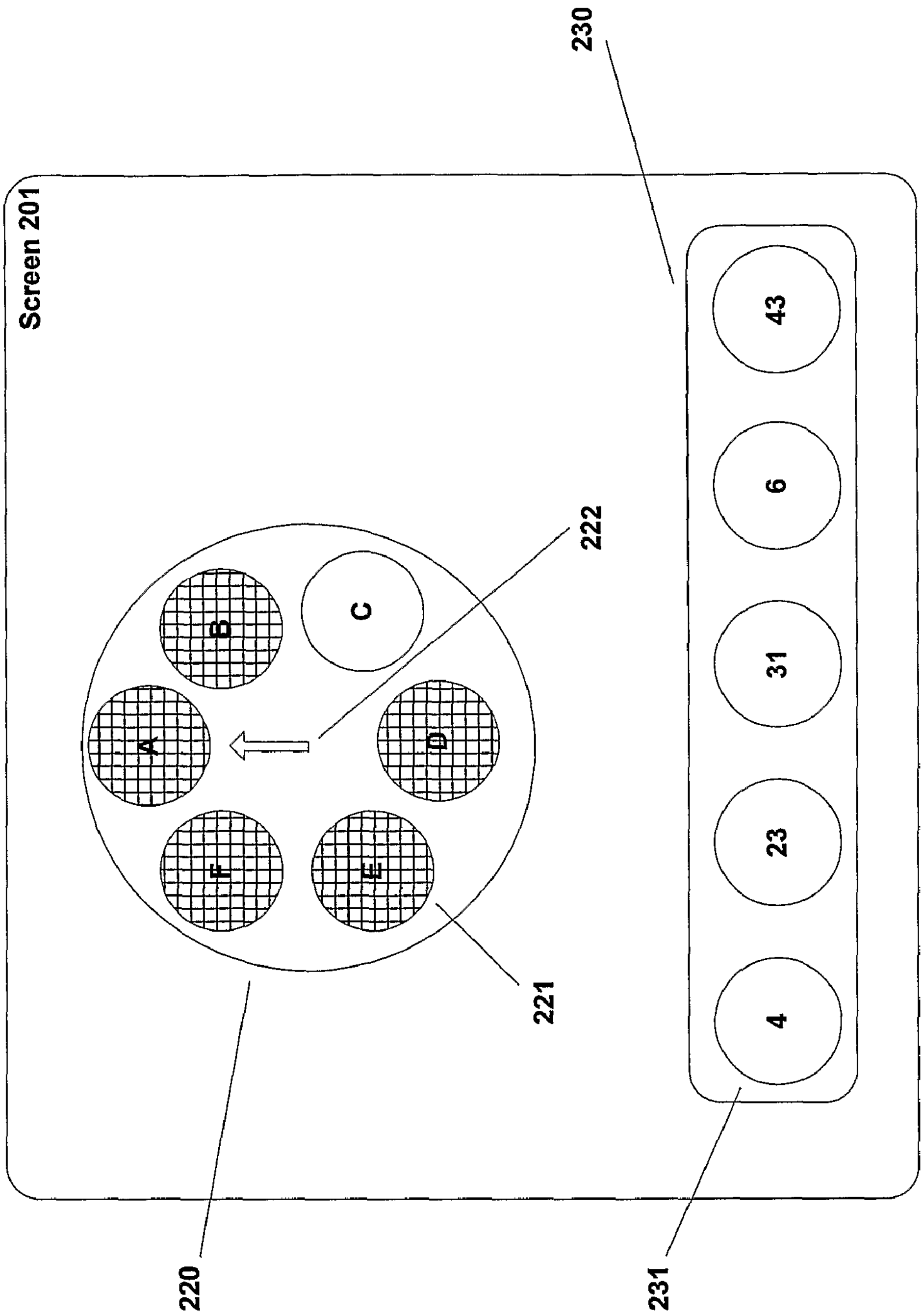

FIG. 2D illustrates the situation after fourth and fifth input numbers have been provided, which in the present example are assumed to be the final two input numbers 231. The cyclic selector 220 has implemented the rotation for the fourth input number (6), which progressed the selector arrow 222 from option ball F to option ball D, and also for the last input number (43), which progressed the selection arrow 222 from option ball D to option ball A (after many complete "circuits"

of the two remaining option balls). Accordingly, option balls D and A are also shown as hatched in FIG. 2D.

The outcome of the above selection is that all the option balls apart from option ball C have been eliminated, which therefore leaves option ball C as the single outstanding selection. In other words, the five input numbers 231 shown in number block 230 have been used to drive a randomised selection process that has eliminated all the options from the cyclic selector 220 apart from option ball C.

The sequence of FIGS. 2A-2D may be supplied as a graphical animation on a web page. Another possibility is that the sequence of FIGS. 2A-2D is implemented by an animation downloaded onto a mobile telephone (which can then receive information about the sequence of input numbers in order to activate the graphical selector). The sequence of FIGS. 2A-2D may also be incorporated into television programming, delivered over any appropriate network (cable, satellite, digital, the Internet, etc).

The cyclic selection process depicted in FIGS. 2A-2D provides a visually interesting and appealing mechanism for converting a sequence of input numbers into a single selection. The selection is derived in a highly transparent manner, and so is readily subject to confirmation by the participants or viewers and any necessary independent verification. In addition, the selection is very flexible and open to many different configurations, e.g. as to the number and type of selections (or remaining options).

For example, in FIGS. 2A-2D, the initial number of option balls was one greater than the number of input numbers. Consequently, after elimination of one option ball by each input number, there was a single remaining ball (ball C). However, in other implementations, the number of option balls could be increased, so that more than one option ball remains after elimination of one option ball by each input number. For example, if there are eight option balls and five input numbers, then after elimination three option balls will remain. It will be appreciated that an appropriate number of option balls can be provided to result in any desired number of remaining balls (for a given number of input numbers).

If the initial number of option balls 221 is an exact divisor (i.e. a factor) of the total number of possible input numbers, then there is no bias in the cyclic selector 220. For example, if the input numbers range from 1 to 48 and there are six option balls (as shown in FIGS. 2A to 2D), then each option ball corresponds to 8 input numbers and so is equally likely to occur, irrespective of the starting position of selection arrow 222.

On the other hand, if there were 49 possible input numbers (and still 6 option balls), there would be a slight bias in favour of eliminating the option ball corresponding to the starting position of selection arrow 222, since this option would correspond to one additional input number (49) compared to all the other options. However, this slight bias is readily predictable, and can be overcome by initially selecting a random start position for the selection arrow 222 within the cyclic selector (rather than necessarily starting at option ball A). Another possibility is to randomise the initial order of the option balls 221 within the cyclic selector, so that instead of having ABCDEF, the options balls might have the order CAFEDB (for example). This randomisation may be performed once, at the start of a succession of input numbers, or alternatively before each successive input number.

Figure 3A:
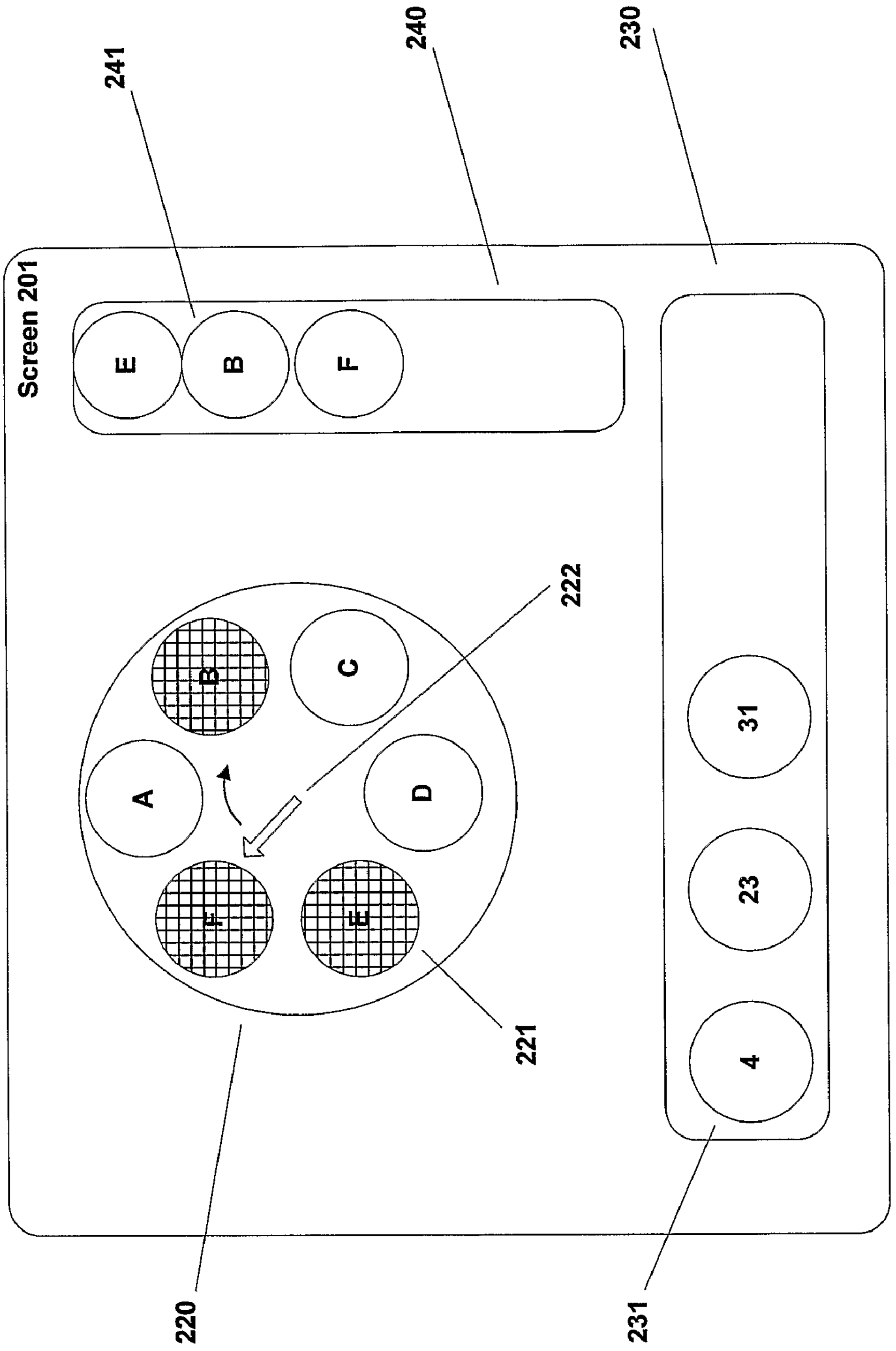
FIG. 3A shows a screen image in accordance with another embodiment of the invention.
Figure 3B:
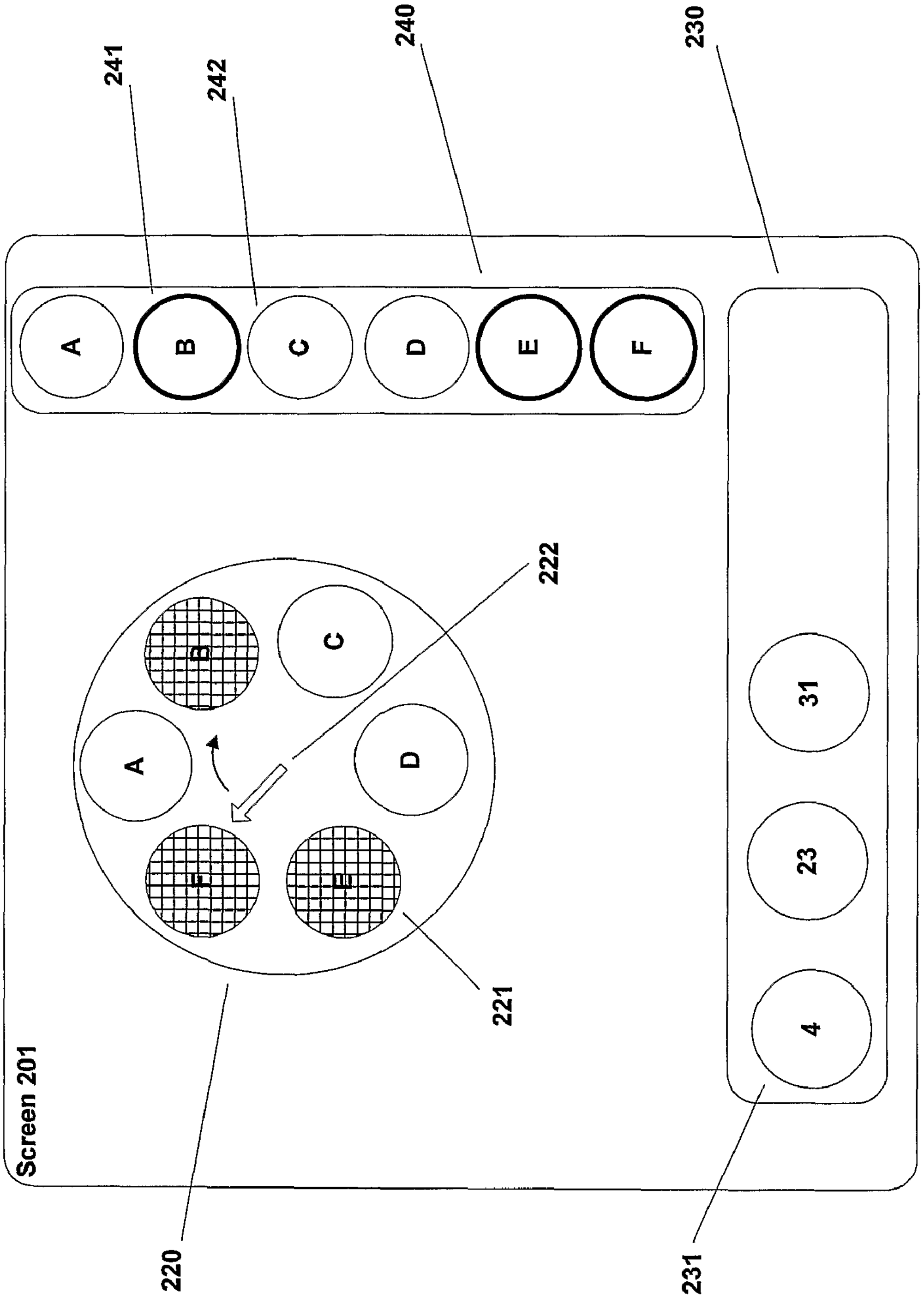
FIG. 3B shows a screen image in accordance with a modification of the embodiment of FIG. 3A.

FIGS. 3A and 3B show a modification on the selection process of FIGS. 2A-2D. Note that in these embodiments, the operation of the cyclic selector 220 itself is the same as described with reference to FIGS. 2A-2D. However, as option balls are "eliminated" from the cyclic selector, they appear instead in a separate accumulation block 240 of the screen. Thus the balls 241 shown in accumulation block 240 (balls E, B and F) correspond to those option balls shown as hatched in the cyclic selector, and also reflect the sequence of input numbers 231 (i.e. 4, 23, 31).

It will be appreciated that the embodiment of FIG. 3A leads to an accumulation of selected options. For example, with the same sequence of balls as in FIGS. 2A-2D, accumulation block 240 would end up containing the options E, B, F, D, A. This set of options can be used, for example, to represent a hand in a game of cards, as described in more detail below. As previously mentioned, the number of option balls 221 may be more than one greater than the total number of possible input numbers, depending upon the particular application involved.

FIG. 3B represents a modification on the approach of FIG. 3A, although the general selection strategy is the same. Accumulation block 240 is now used to present all possible options from the cyclic selector 220. Accordingly, as the cyclic selector picks individual options 221, the representations of these options in block 240 are modified so as to be visually distinguished from the remaining options in block 240. FIG. 3B illustrates three highlighted options 241 in block 240, namely options B, E and F (corresponding to the three options selected in FIG. 3A). In contrast, the balls 242 that have not been selected so far (namely balls A, C, and D) are not shown as highlighted in accumulation block 240.

It will be appreciated that a similar representation to that of FIG. 3B may also be employed with the elimination technique of FIGS. 2A to 2D. In this case, all the balls in accumulation block 240 may start off as highlighted, but then lose their highlighting once the corresponding option has been eliminated by the cyclic selector 220. In addition, the approach of FIG. 3B could be implemented directly within cyclic selector 220 itself (which would therefore allow accumulation block 240 to be omitted). For example, a first colour might be used to represent those options that had not yet been selected/accumulated (i.e. those shown as options 242 in FIG. 3B), while a second colour might be used to represent those options that had already been selected/accumulated (i.e. those shown in FIG. 3B as hatched within cyclic selector 220, and highlighted in accumulation block 240).

Figure 3C:
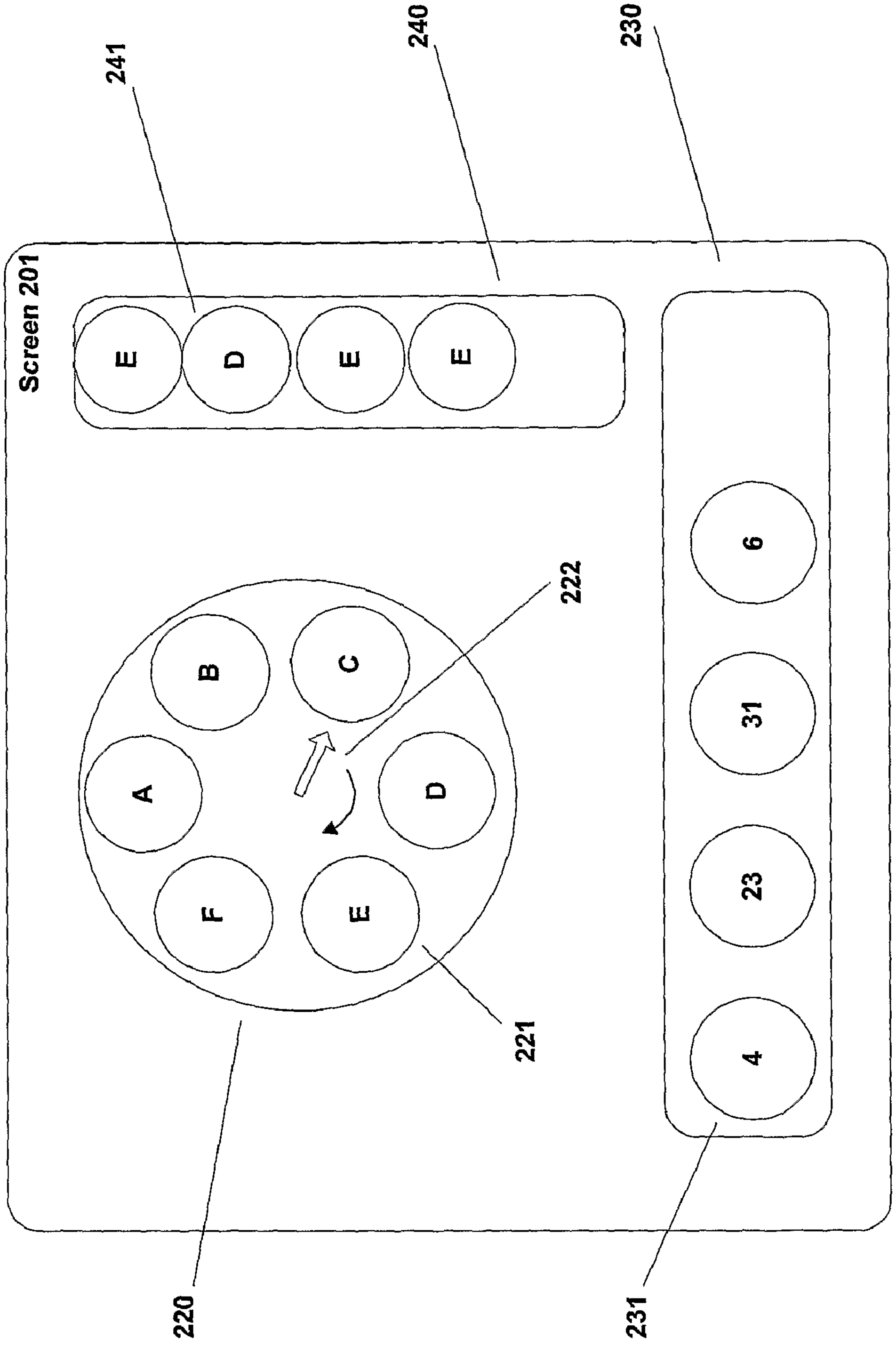
FIG. 3C shows a screen image in accordance with a modification of the embodiment of FIG. 3A.

In the embodiments of FIGS. 3A and 3B, the cyclic selector in effect removes options corresponding to previous input numbers. For example, once option E has been selected and so has appeared in accumulation block 240, then this option is no longer available within the cyclic selector 220. However, in an alternative embodiment, the option balls can be considered as remaining (or being replaced) in the cyclic selector after selection. Such an embodiment is illustrated in FIG. 3C, which generally operates in the same manner as the embodiment of FIG. 3A, except for the retention of selected options in the cyclic selector. Thus assuming the same sequence of input numbers as in FIG. 2D, the cyclic selector initially chooses option E as a result of input number 4, as for the embodiment of FIG. 3A. However, the next input number, namely input number 23, now leads to the selection of option D (rather than option B as in FIG. 3A). This difference is caused by the fact that in the embodiment of FIG. 3C, the cyclic selector continues to count option E when performing its rotation. Input number 31 then leads back to the selection of option E in FIG. 3C, while the fourth input number 6 repeats the selection of option E. Hence option E is shown three times in accumulation block 240. It will be appreciated that in contrast, the approach of FIG. 3A does not allow a given option to be accumulated more than once (since previous selections are eliminated from the cyclic selector 220). The replacement strategy of FIG. 3C is particularly appropriate where it makes sense in the context of the application to allow a given option to be selected more than once.

Figure 4A:
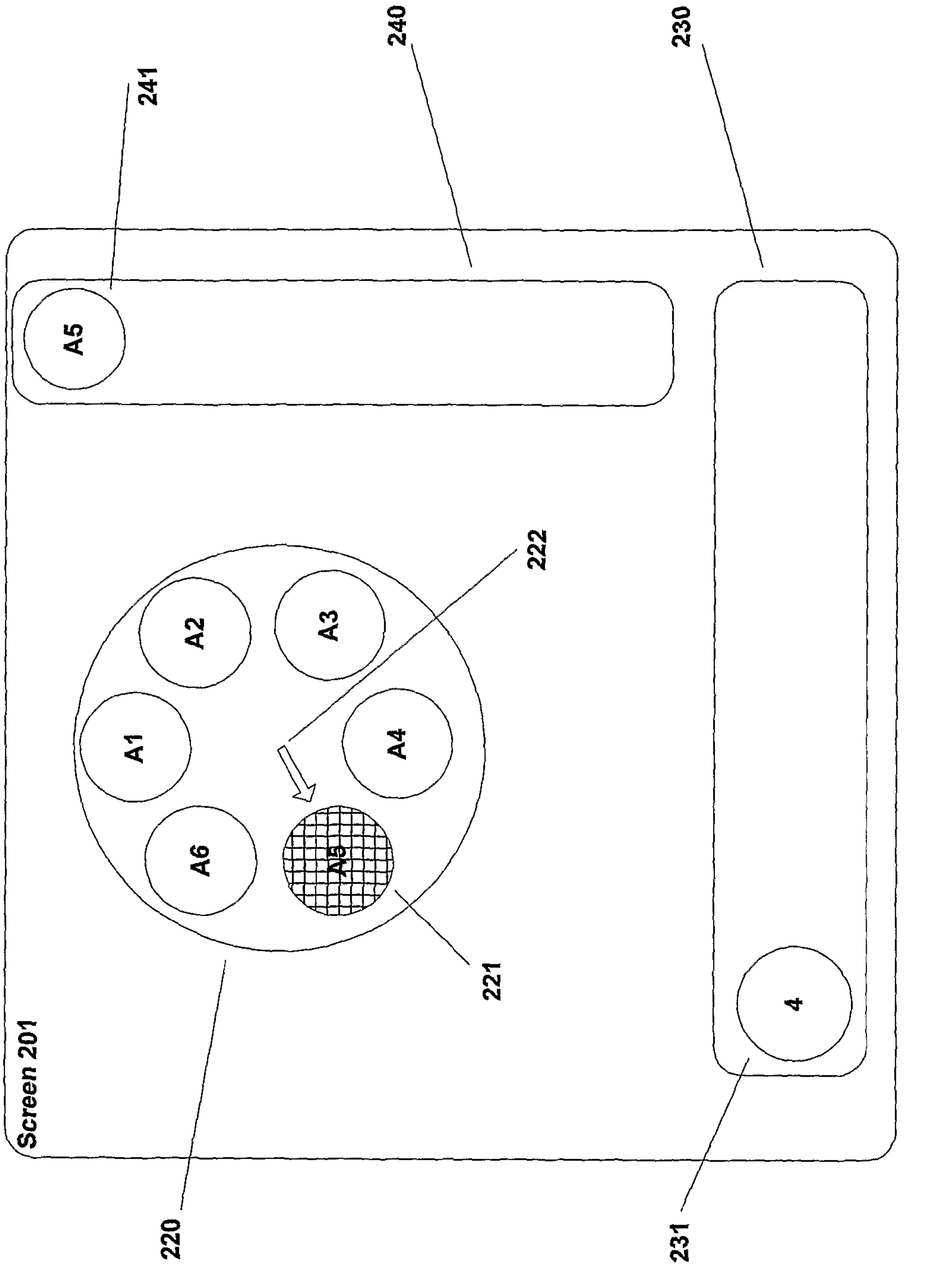
FIGS. 4A-4B show a sequence of screen images in accordance with another embodiment of the invention.
Figure 4B:
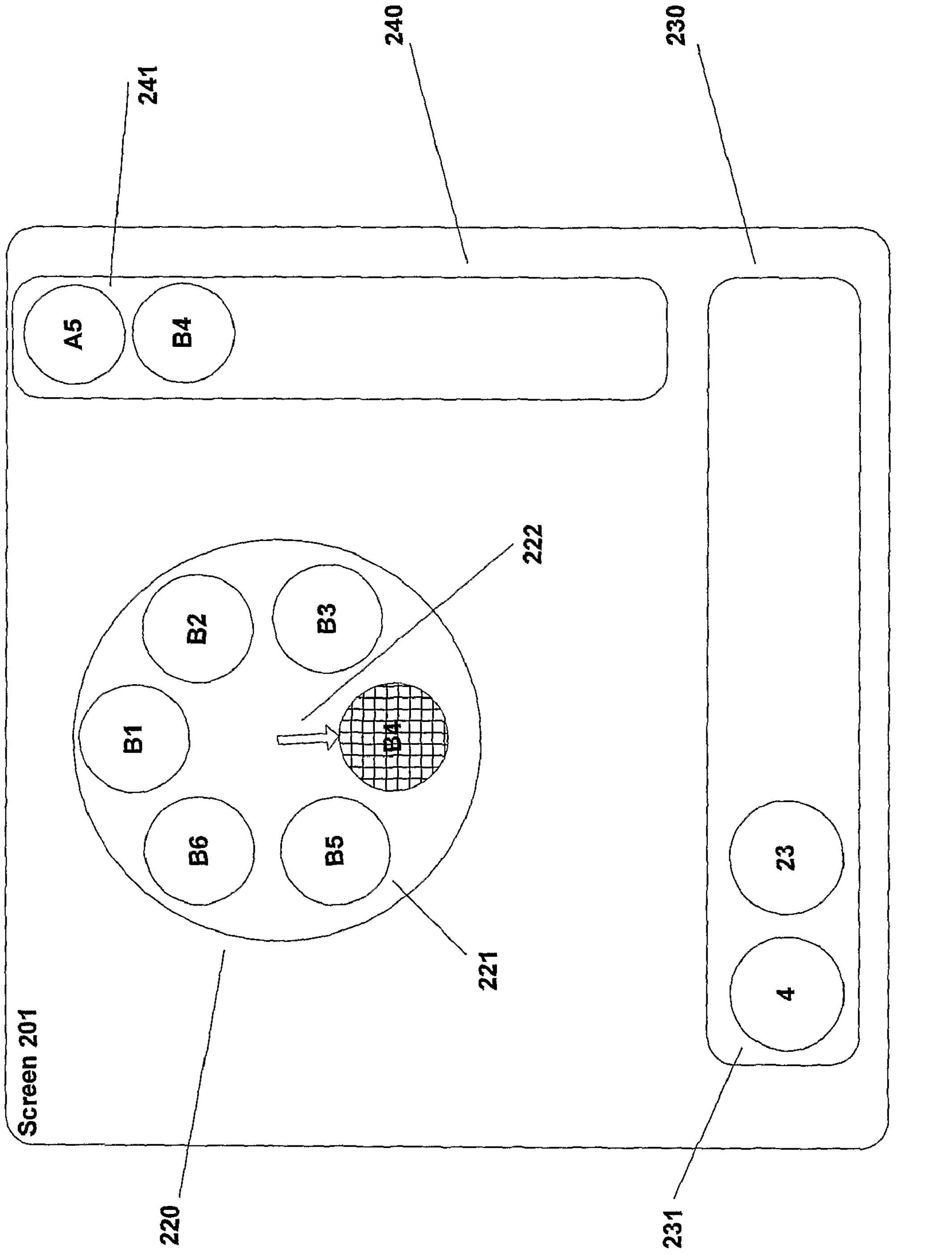

Another possible modification to the embodiment of FIG. 3A is that rather than retaining the same set of options for each input number, an entirely (or partially) new set of options may be provided for each successive input number. For example, FIG. 4A illustrates the situation where the cyclic selector provides options A1, A2, A3, A4, A5 and A6 for the first input number. It is assumed that the first input number is 4, which therefore results in the selection of option A5 (analogous to the selection of ball E in FIGS. 2A and 2B). For the next input number, a new set of options B1, B2, B3, B4, B5 and B6 is provided in cyclic selector 220 (see FIG. 4B). It is assumed that the second input number is 23 (as in FIG. 2B), and starting the rotation from the position corresponding to the previously selected option (i.e. option B5) leads to the selection of option B4. Accordingly, as shown in FIG. 4B, accumulation block 240 now contains (in order) A5 and B4. It will be appreciated that yet further sets of options could be provided for the subsequent input numbers. Note that although FIGS. 4A and 4B both show the same number of options (six) in each set, the number of options might in fact vary from one set to another (i.e. from one input number to another).

The skilled person will be aware of many possible modifications to the system described so far. For example, with reference to the cyclic selector 220, selection arrow 222 might be stationary, with the options 221 rotating around it (by the appropriate amount). Another possibility is that arrow 222 is omitted altogether and some other mechanism used to illustrate rotation, for example, each of the options 221 around the circumference of cyclic selector 220 may be highlighted in turn. The rotation may also be anti-clockwise rather than clockwise, and the direction of rotation may vary from one input number to another (according to some defined pattern). In addition, although the circular shape of the cyclic selector 220 corresponds well to the nature of the selection process, other shapes or designs may be adopted. For example, the cyclic selector might be modelled as a three-dimensional cylinder, rotating about its axis, and seen from a direction perpendicular to this axis (in this case not all the selection options would be visible at the same time). In addition, the cyclic selector and/or the various options need not be represented by circles, but any other suitable shapes could be employed (which may be different between the different options, for example, squares, stars, and so on).

In some embodiments, the cyclic selector 220 may include a counter and/or a specialised start location. The counter might be positioned in the centre of the selector (or at any other suitable position within screen 201), and count down from the relevant input number. When the counter reaches zero, this then indicates the selected option. For example, in the configuration of FIG. 2A, the counter would be set to 4 on receipt of input number 231. The counter would then decrement to 3 as arrow 222 moved from ball A to ball B, to 2 as arrow 222 moved from ball B to ball C, to 1 as arrow 222 moved from ball C to ball D, and finally to 0 as arrow 222 moved from ball D to ball E. Such a counter provides a useful visual indicator of when the arrow is about to stop rotating.

A dedicated starting position for arrow 222 within cyclic selector 220 may be provided prior to receipt of the first input number 231. This starting position might then be skipped or removed during the counting around the selector. Note that the location of the start position relative to the various options in the cyclic selector might be randomised before the first input number is received (this provides one mechanism to eliminate any initial bias). The use of a special starting option could be repeated for subsequent input numbers, if so desired (also potentially with randomisation).

A further possible modification is that options that have already been selected, and hence are no longer available for selection (i.e. those shown as hatched in FIGS. 2 and 3) might be removed altogether, with the remaining options then perhaps redistributed evenly around the circumference of the cyclic selector. Another possibility is that there is a separate cyclic selector for each input number, perhaps arranged side by side with one another, or circumferentially within one another.

Figure 5A:
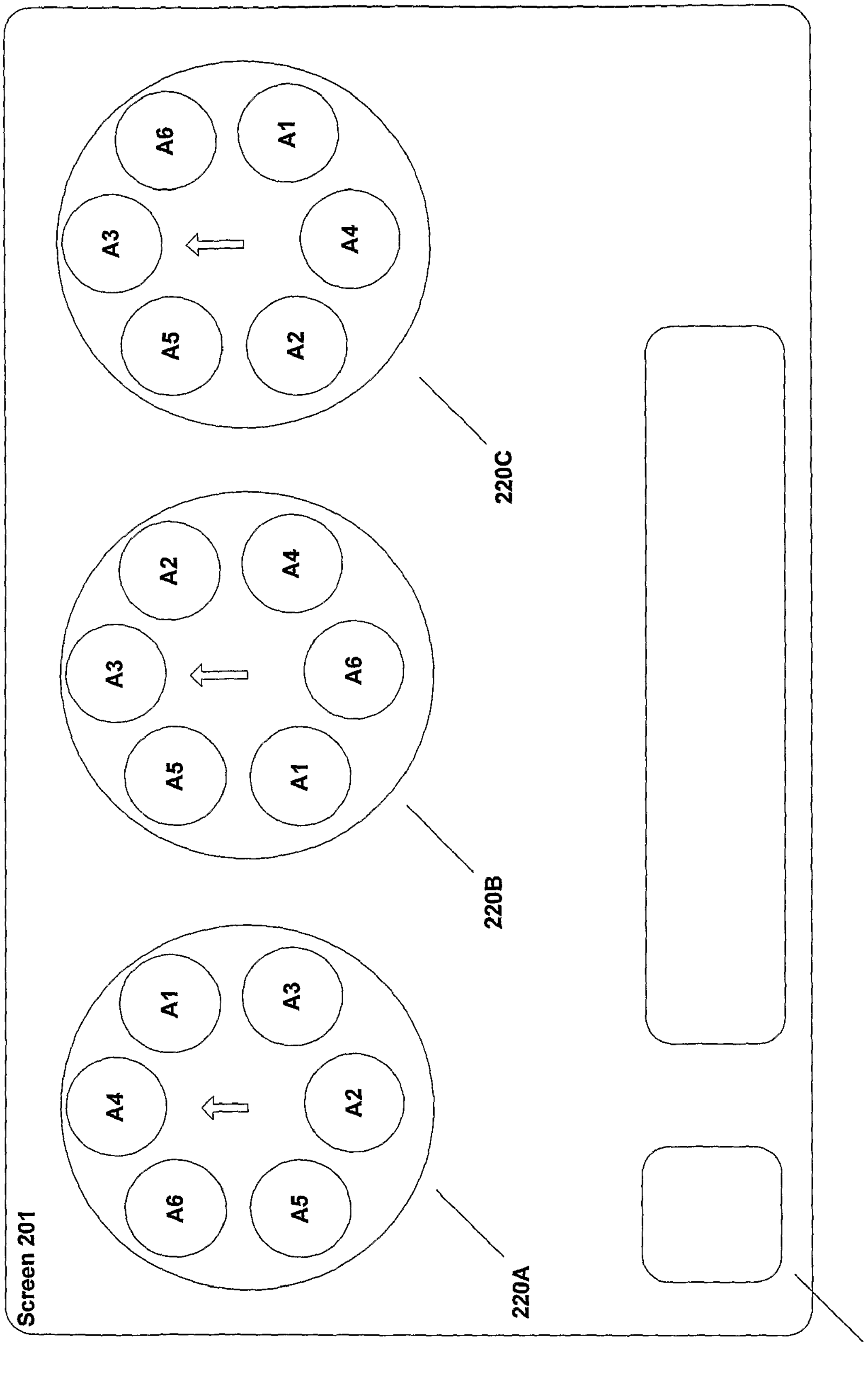
FIGS. 5A-5B show a sequence of screen images in accordance with another embodiment of the invention.

FIG. 5A illustrates another implementation, this time with multiple cyclic selectors 220A, 220B, 220C. The particular embodiment of FIG. 5A comprises three such cyclic selectors, but in other embodiments, there may be more or fewer cyclic selectors. The multiple cyclic selectors of FIG. 5A are all triggered by a single input number that is received into number panel 230. Note that prior to receiving this input number, the order of the options within each of the various cyclic selectors 220A, 220B, and 220C is randomised. This avoids all three cyclic selectors producing the same output for a given input. (Another option would be to randomise the starting position of the selection arrow within each cyclic selector).

Figure 5B:
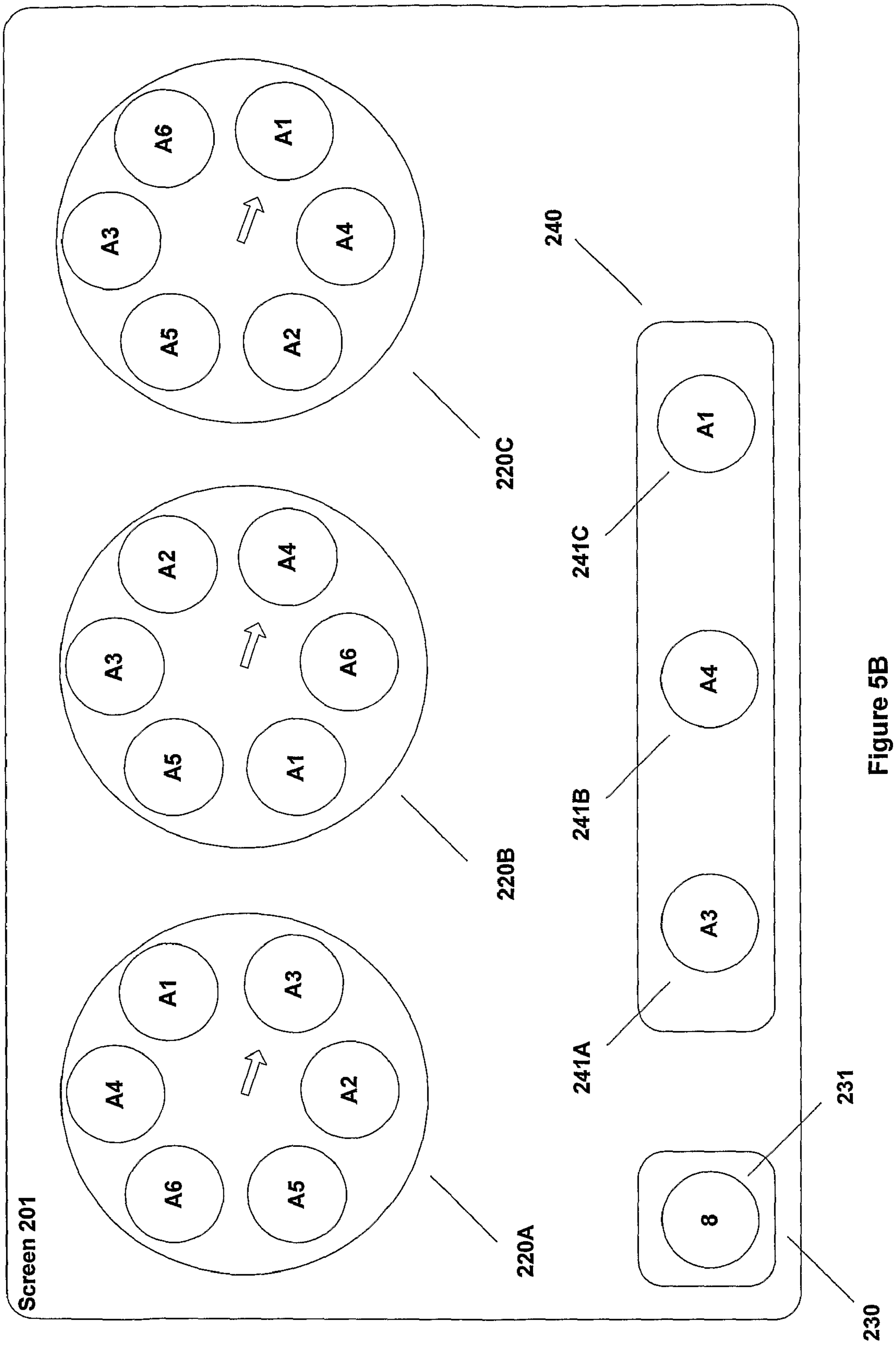

FIG. 5B illustrates screen 201 after an input number 8 has been received, as shown by ball 231 within number panel 230. This input number causes each cyclic selector 220 to operate as previously described, so that for all three cyclic selectors shown in FIG. 5B, the selection arrow has advanced 8 spaces, corresponding to the value of the received number ball 231. This has then produced an output A3 from selector 220A, A4 from selector 220B, and A1 from selector 220C. These outputs are displayed in panel 240, with ball 241A showing the output from selector 220A, ball 241B showing the output from selector 220B, and ball 241C showing the output from selector 220C. The implementation of FIGS. 5A and 5B therefore allows multiple options to be selected from a single input number. This provides improved flexibility in devising games or other material to exploit the cyclic selector 220.

Note that in operation, the selection arrows in the various cyclic selectors 220 of FIG. 5B may all step around in parallel with one another to produce their output substantially simultaneously. Alternatively, each cyclic selector may operate in turn. For example, upon receipt of ball 231, cyclic selector 220A may operate to produce output ball 241A; then cyclic selector 220B may operate to produce output ball 241B; and lastly cyclic selector 220C may operate to produce output ball 241C. Furthermore, although FIGS. 5A and 5B show three identical cyclic selectors, in other implementations, there may be variations between the different cyclic selectors displayed. For example, there may be variations as regards the number and/or type of available options, the configuration and shape of the various cyclic selectors, and so on.

The cyclic selector 220 can be employed in a wide variety of formats and situations, as illustrated by the following examples:

(a) the cyclic selector might be arranged as a spiral format, so that as the selection process steps through the options, there is a general progression towards (or away from) the centre of the spiral. This can then be used to denote some increasing or decreasing facet of the selection process. For example, if the output options on the selector represent potential prizes, the selection options nearer to the centre of the spiral might correspond to more valuable prizes.

(b) the cyclic selector might be multi-layered. Thus as any given option is selected, this reveals the option corresponding to the layer below, which now becomes available for future selection. The depth of the layer reached may again denote some increasing or decreasing property, such as the level of prize money involved.

(c) the cyclic selector might comprise multiple concentric rings. The different rings may all have the same set of options, or more options may be available as you progress outwards through the rings (given that there is more space on the outer rings). An input number can be provided for each ring in turn, and transformed into a corresponding output number by counting around the ring. Note that the same input number may be used for all the rings, or each ring may instead have its own input number.

(d) a single screen may comprise multiple selectors, which can all be activated by one input number. The selectors may all be the same, or may differ from one another in the number, order and/or identity of the output options. One possibility is that the multiple selectors operate in parallel, and all rotate by the same input number to produce multiple outputs, one per selector (as shown in FIGS. 5A and 5B). In another arrangement, the selectors are arranged in series or cascaded, so that the first selector in the series receives the input number. The output from the first selector in response to the input number is then used as the input to the second selector. The output from the second selector may then be used as the input to the third selector (if present), and so on. In this series configuration, only the output from the final selector in the series may be relevant, or alternatively the output from each selector in the series may be retained to provide a set of outputs, one per selector (analogous to the parallel configuration of FIG. 5B).

A selector such as described above may be used to provide a secondary game in conjunction with a primary game. The primary game may comprise an on-line gaming application, such as poker or roulette, whether provided over a computer network such as the Internet, a mobile telephone network, a digital television network, and so on. Alternatively, the primary game may comprise some activity within an entertainment or gaming venue, such as a bingo hall or a casino. Another possibility is that the primary game is derived from some television programming, such as coverage of a poker tournament.

The secondary game derives input number(s) 231 for input to one or more selectors from the main or primary game, such as poker, roulette, bingo, and so on. In some cases, the input numbers may be automatically available on-line to feed into the selector. For example, if the primary and secondary games are both operated on the same web-site, number or card selections from the primary game can easily be passed as input numbers to the secondary game. In other implementations, there may be some form of human involvement. For example, if the primary game is a live poker tournament, then there may be a human operator to enter the card selections from this primary game into the selector as input numbers for the secondary game.

The output from the selector(s) is then used to drive the secondary game, which may or may not be the same as the primary game. For example, if the primary game is roulette, the secondary game may also be roulette, or alternatively the secondary game might be a different form of game, such as blackjack. In other implementations, the input number to the selector may come from outside the gaming application itself. For example, the input number(s) may be derived from a lottery or any other appropriate source, such as the finishing order of horses in a race. In some implementations, the output from the secondary game may be provided as an input to a further set of one or more selectors to drive a tertiary game. This process can then be repeated to as many levels as desired.

In one implementation over network 601, clients 600 contact server 650 to participate in a secondary game. For example, such contact may be made by logging into a web site for an on-line gaming application, or interacting via a digital television service. In such cases the web site or digital television service will normally also be providing the primary game, although this is not necessarily the case. Another possibility is that the client terminals may be local to a particular establishment where the primary game is occurring, for example in a bingo hall or casino.

Participation in the secondary game may require some form of payment from the client to the service provider. The operator may make an additional charge for participation in the secondary game, for example a credit card billing, or as part of a call charge on a mobile telephone. Alternatively, involvement in the secondary game may be free, where is it intended as an incentive to encourage greater participation in the primary game (e.g. longer duration, increased level of betting, etc). The server may use a standard selector for all players in the secondary game, or at least some players may be provided with their own selectors. In some embodiments, the client accesses a selector which is maintained on and operated by server 650. In other embodiments, having generated a selector, the server downloads the selector onto client 600. In some implementations, the server may randomise the order of the output options before providing or downloading the selector to a requesting player or client. The server 650 then maintains records in database 612 of the ordering of the selector transmitted to a given client. The output of the selector generally determines whether or not the client wins, according to some predetermined set of rules. Note that this determination may be absolute, i.e. based purely on the output for that particular player, or may be relative, i.e. in comparison with the results from other players.

In some implementations of secondary games, a player may be able to configure the selector to his or her desired ordering. For example, a player may be able to specify their own desired ordering for the selector options. The specified order is then stored in server 650 to allow subsequent verification of any win. Such ordering of the selector might be performed, for example, via a given web-site, or using a mobile telephone or digital television service. There may be some (additional) charge associated with the ability to reorder a selector, which may be collected via the web-site, as a telephone charge, and so on.

In secondary card games, the selector 220 may be used to simulate a deal from a set of cards. In one implementation, the selector has 52 positions, one for each card in a standard deck. Each position may be provided with a suitable graphic to indicate the corresponding card. In one implementation, the available output options are drawn in the form of playing cards (rather than the balls of FIGS. 2-5). The order of the cards in the selector may be randomised, to reflect shuffling of the pack. A single card is then selected by an input number, as described above in relation to FIG. 3A. A variation of this implementation has a selector with 13 positions, representing the 13 cards in a suit. The suit of the selected card might then be chosen by a separate selector with four positions, each corresponding to one of the four suits. This selector may be arranged concentrically with the card number selector, and may be driven if desired by the same input number. Alternatively, each of the 13 positions in the card number selector may be considered as comprising a stacked pile of the 4 different suits (which may be randomised in order in the pile), with only the topmost suit of the pile visible on the selector. As a given card number is selected, this takes the suit visible on the top of the pile. The next suit down in the pile is now exposed, and is allocated to the next card of that number to be selected. The skilled person will be aware of other possible mechanisms for using selector 220 to emulate the dealing of cards.

If the primary game is also based on cards, then the input numbers to the selector are determined from cards drawn in the primary game. The input number corresponding to a given card can be derived as standard: A=1, 2=2 . . . J=11, Q=12 and K=13. The suit of the card may then be used to derive a second input number (e.g. clubs=1, diamonds=2, hearts=3, spades=4). Alternatively, each card in a 52 card pack may be assigned a unique number (e.g. clubs 1-13, diamonds 14-26, hearts 27-39, spades 40-52). In either approach, a given card from the primary game can then be used to specify a given card for the secondary game.

Using the above approach, for each card a player receives in a primary game, the selector can be used to determine another card to receive in the secondary game. Note that some care is needed where a player's hand in the primary game is private to that player—i.e. where one player can not see at least some of the cards belonging to another player (this is the case for at least part of the deal in poker). In these circumstances, a selector would generally be specific and private to a given player, otherwise the operation of the selector might divulge the contents of a player's hand in the primary game. However, in games where hands are not private (e.g. blackjack), then a single shared selector can be used by and visible to all players in a game.

A popular poker game is Texas Hold'em, in which each player is dealt 2 cards face down. Following any betting, 3 cards are dealt face up on the table, followed by a further two. Players win by making the best 5 card poker hand from the 2 cards they hold and the 5 on the table. A poker secondary game may be based on a primary game of Texas Hold'em. For example, a player purchases a selector 220 to participate in the second chance game. The selector contains 52 cards and is initially randomised. As the table cards are dealt in the primary game (the Flop, the River, etc), these cards trigger the selectors for each participant in the secondary game to generate a card which goes into the hand for the secondary game. One way of doing this is to allocate each card in a deck a unique number from 1 to 52; the input number for the selector then corresponds to the unique number for the card dealt in the primary game.

At the end of the primary game, each player who is still in has a 5 card hand for use in the secondary poker game. This second hand may be used for a standard round of poker. Alternatively, some other winning scheme may be applied in the secondary game. For example, all the hands in the secondary game might be compared directly (without further betting), with the winning hand taking the secondary pot (perhaps less a house percentage) based on the total from the players to buy their selectors for the secondary game. Another option would be for a given type of hand to pay fixed odds. For example, a three of a kind in the secondary game might pay back the original stake at 4:1. Note that these latter possibilities have the advantage of being quick and automatic, with no further actions required on the part of the player. Note also that the secondary game provides an incentive for a player to stay in the game—their primary hand may not win but they might win on the secondary. This would generally increase the level of betting, and so would be attractive to operators who take a fixed percentage of bets.

In another application, the secondary game is based on blackjack and the primary game is poker. In this application, each player again has his or her individual selector, since the poker cards from the primary game are private to a given player (unless the secondary game is based entirely on the table cards). In one particular implementation, a player receives one card in the secondary game for each card that they receive in the primary game. If the player's blackjack hand totals exactly 21, the player receives a fixed odds payout. In this blackjack variant, a player keeps receiving cards until they reach 21 (win) or exceed 21 (lose). If they finish with a five card hand that remains below 21 they may also win a fixed odds payout. This implementation is automatic, without the need for any decision making from the player, to avoid any delays to the primary game. In other implementations of a secondary blackjack game, rather than a fixed odds payout, the players may play against each other and/or a bank, where the winner has the highest card total (provided the total does not exceed 21). In this case, it may be appropriate to allow a player to stick or hold (so that they do not receive any further cards in the secondary game).

Another possibility is to use blackjack itself as a primary game for blackjack as a secondary game. Because all players in blackjack see the cards being dealt, it is possible in this case to have a single selector shared across the table. Each card dealt to a player in the primary game is fed to the selector, which generates a corresponding card for the secondary game. In one implementation, any player getting exactly 21 in their hand for the secondary game wins at fixed odds. If the player sticks in the primary game when their hand in the secondary game has not yet reached 21, then they lose in the secondary game. The player also loses in the secondary game if their secondary hand exceeds 21 (i.e. bust). However, if the secondary hand makes exactly 21 the player wins in the secondary game (irrespective of whether the player continues to draw cards in the primary game). The skilled person will be able to think of many further variations for playing poker, blackjack and other card games as secondary games.

In some applications, roulette is used as a primary game to generate input numbers for a selector, where the output numbers from the selector are applied to a secondary game of roulette. A user may pay to participate in the secondary game, for example, by purchasing a particular selector. The roulette of the primary game may represent an on-line version of roulette, or may instead represent a real physical game in a casino. In the latter case, participation in secondary games based on the roulette may potentially be limited to terminals at the casino, or may be more widely available, for example over the Internet.

The selector to generate the roulette numbers for the secondary game may have the same set of 36 numbers as a standard roulette wheel (plus one or more zeroes if appropriate). These 36 numbers may be presented in the same order as a conventional roulette wheel and with the standard colour allocations (this familiarity may be appealing for players). In this case, the starting position of the selector arrow 222 can be initially randomised (to avoid having the same set of numbers in both the primary and secondary games). In other embodiments, the ordering of the roulette wheel may be different in the secondary game (e.g. it may be randomised compared to a standard roulette wheel).

In one implementation, the secondary game maintains the same bets as the primary game. For example, a player may bet on red and odd on the primary game, but lose when the result is black 6. The number 6 is then used as an input number to the selector for the secondary game, and the player wins if the secondary game results in a red or odd output. Another possibility is to use the secondary bet as some form of accumulator bet. Thus rather than immediately pay out any winnings in respect of a secondary bet, the winnings are held over as the bet for the next secondary game. Alternatively, if a player wins in the primary game, their winnings may be automatically carried over as their stake into the secondary game. Note that this process can be repeated if desired into tertiary and further games.

In another implementation, the selector generates a second chance bet rather than a another number. For example, continuing with the example above, where a player bets on odd and red and loses on a black 6, the selector for the secondary game may generate a bet on black, which would then win (given the original result of black 6 from the primary game).

The existence of the secondary game also allows a player to make additional bets, based on the relationship between the results from the primary and secondary games (assuming that the selector for the secondary game generates a result analogous to a standard roulette wheel). Examples of such bets are whether the two output numbers (one from the primary game, one from the secondary game) are both odd; both even; one odd/one even; both red; both black; one black, one red and so on. Other possible bets are whether the output number from the secondary game is above or below the output number from the primary game; or whether the total of the two output numbers is odd or even, or is above or below a specified number. Another possible bet is on the value of the difference between the output numbers from the primary and secondary games. Note that these bets can be extended to tertiary roulette games and beyond by cascading selectors (so that the output from the secondary game provides input to the tertiary game and so on). For example, if there are three games involved, there may be a bet on whether all three output numbers are red, or whether their total exceeds some predetermined value.

In some applications, a primary game of roulette may be used to generate input numbers for a selector that outputs cards, for example for a secondary game of blackjack or poker. For example, successive spins of a roulette wheel may generate cards for a secondary blackjack game, where a total of 21 wins automatically (as described above).

In some applications, the primary and secondary games may be based on bingo (bingo 90 for Europe or bingo 75 for US), such as played on-line or in a bingo hall. In one implementation, a player pays to participate in the secondary game, and receives a secondary bingo card analogous to their primary bingo card (but with a different set of numbers). As each number is drawn in the primary game, a selector is activated to generate a corresponding number for the secondary game. Players in the secondary game then aim at the same patterns as for the primary game (i.e. complete line, complete coverage of all numbers—a "coverall", etc).

Of course, once a winning card has been achieved in the primary game, no further numbers are drawn in the primary game. This then in effect terminates the secondary game, despite the fact that a coverall may not yet have been achieved. There are various possible strategies to handle this eventuality. One possibility is that once the primary game terminates, the winner of the secondary game is the player closest to a coverall. Another possibility is that if there is a coverall in the primary game before there is a coverall in the secondary game, then the prize from the secondary game is rolled over to the next secondary game. An alternative approach is to increase the likelihood of a coverall being achieved first in the secondary game rather than in the primary game, for example by marking off certain starter numbers in the secondary game as already drawn, or by increasing the number of free (empty) spaces on a card for the secondary game.

In one particular implementation, the numbers from a bingo 90 primary game might be used to play a bingo 75 secondary game. Various mechanisms can be used to accommodate the larger set of numbers in the primary game than in the secondary game. One possibility for example is for the selector to have 90 output selections, but 15 of these are blank (the remaining 75 correspond to numbers 1-75 for the bingo 75 secondary game). If an input number corresponds to a blank output option, then no number is provided to the secondary game for that particular input number. Another option is to add a further line to a standard bingo 75 card for the secondary game, where this additional line contains five numbers selected randomly from 76-90. A further possibility is to assign the centre spot of a bingo 75 card a number from 76-90. A card might be a winner only if this centre spot number is the first number to be called from 76-90.

In some applications, a selector may be used to play a secondary game that is distinct from the primary game, in particular a secondary game that is customised for this purpose (rather than being a variant of a standard gaming application). Such a secondary game may be kept relatively simple so as not to distract the player from the primary game, although more complex secondary games may be developed if so desired.

In one application, where the primary game involves cards, one selector may be provided for a player, and a different selector provided for the house. Each selector outputs a single card for the secondary game, for example, using the last card from the primary game as the input number. The player then wins if the card from his or her selector is higher than the card from the selector for the house. Instead of playing against the house, the player might instead play against the last card from the primary game. In a variation of this game, the player has to predict whether the card output from the selector will be higher or lower than the last card from the primary game, and wins if the prediction is correct. A similar "high-low" game may also be played with other primary games, such as roulette or bingo.

Another possibility is for the secondary game to be largely separate from the primary game (apart from the use of an input number from the primary game). For example, the secondary game might involve a player having to predict the output of a selector, which may be populated with categories such as photographs of famous people, sports, etc. In this secondary game, multiple selectors might be provided (in parallel or cascaded) to make the prediction more difficult. Alternatively, the different categories for selection on the selector might comprise quiz questions (or quiz topics). Once an input number has been received from the primary game, then a player has to answer the relevant question as specified by the selector.

In some applications, the output of the selector is used as an ancillary to the primary game (rather than for a secondary game per se). For example, a participant in a primary game may receive his or her own selector populated with rewards in certain winning spaces, with the remaining spaces on the selector representing blank or losing spaces. For example, if the primary game is blackjack or poker, the following set of rewards might be available:

a) credit to player's account;
b) free bet of specified amount (or re-bet) in next deal;
c) refund of last losing bet;
d) double win from next winning bet;
e) double next bet for free;
f) free entry or stake for participation in another game (e.g. on same web-site or run by same operator)—e.g. token for roulette or bingo card;
g) promotional items or prizes;

h) points (which may in turn be accumulated for rewards)—to encourage increased participation.

This personal selector may be triggered by appropriate events in a primary game, such as the first or last card in a game of poker or blackjack, or the spin of a roulette wheel. The personal selector may only be triggered at certain thresholds, for example every tenth hand in a game of cards, to encourage continued participation.

Other examples of how a selector may be used in relation to a primary game are:

(a) the cyclic selector is based on a number, say 100000. The cyclic selection involves the placing of a comma between the digits of the number, and so in turn determines the amount of prize money for the primary game: for example 1,00000 (=1), 10,0000 (=2), and so on. Alternatively, the selector may be used to determine individual digits of a prize figure. For example, the prize figure may have a total of four digits, so a maximum of 9999, but the selector is used to determine the exact value, one digit at a time, such as by using the accumulation panel shown in FIGS. 3A-3C (the numbers in the accumulation panel corresponding to the digits of the total prize money). A separate selector might also be used to determine the currency in which the prize money is to be obtained.

(b) the selector represents a staircase, with each step corresponding to a prize, where the prizes increase in value towards the top of the staircase. The selection determines the prize to be won. Note that while the selector ascends the staircase one step at a time, it may jump from the top step back to the bottom step. Alternatively, it may reverse direction, and then descend one step at a time.

(c) the selector options are a set of destinations, which may be represented by locations on a globe. The selector is used to select one of the destinations, for example as a prize.

In conclusion, a variety of particular embodiments have been described in detail herein, but it will be appreciated that this is by way of exemplification only. The skilled person will be aware of many further potential modifications and adaptations that fall within the scope of the claims and their equivalents.

The invention claimed is:

1. Apparatus for use in a gaming application, the apparatus comprising:

an input for receiving a non-predictable input number, K; and a cyclical selector comprising N output options, wherein said cyclical selector is configured to randomise the positions of the N output options within said cyclical selector prior to receipt of the input number and to cyclically count through said N randomised output options in accordance with the received number K to select one of said N output options, thereby transforming the non-predictable input number K into a selection of an output option; and an output for providing a graphical display of the selected output option.

2. The apparatus of claim 1, wherein said selector is arranged to provide a graphical display which is animated to step sequentially through said N output options in accordance with the received number K.

3. The apparatus of claim 1, wherein said apparatus is configured to receive a succession of numbers at said input.

4. The apparatus of claim 3, wherein an accumulation of output options selected so far by the cyclical selector for a succession of input numbers is presented as an output.

5. The apparatus of claim 1, wherein the apparatus is configured to randomise the starting position for said cyclical selector in the sequence of N output options prior to receipt of the input number.

6. The apparatus of claim 1, wherein said cyclical selector is configured to present multiple cyclical selectors, and wherein each of said multiple cyclical selectors is configured to receive said input number K and to select a corresponding output option.

7. The apparatus of claim 1, wherein said cyclical selector is configured to present multiple cyclical selectors arranged in series, wherein the first cyclical selector in the series is configured to receive said input number K, and subsequent cyclical selectors in the series are configured to receive as input the output from an immediately preceding cyclical selector in the series.

8. The apparatus of claim 1, wherein said non-predictable input number is derived from a primary game, and said selected output option is applied to a secondary game.

9. The apparatus of claim 8, wherein said primary game is based on cards.

10. The apparatus of claim 8, wherein said primary game is based on bingo.

11. The apparatus of claim 8, wherein said primary game is based on a casino game.

12. The apparatus of claim 8, wherein said secondary game is based on cards.

13. The apparatus of claim 8, wherein said secondary game is based on bingo.

14. The apparatus of claim 8, wherein said secondary game is based on a casino game.

15. The apparatus of claim 8, wherein said secondary game is based on a comparison of the input number with the selected output option.

16. The apparatus of claim 8, wherein said secondary game is based on a combination of the input number with the selected output option.

17. The apparatus of claim 1, wherein said selected output option corresponds to a potential reward provided by the gaming application.

18. The apparatus of claim 1, wherein the non-predictable input number K comprises data indicative of a race.

19. The apparatus of claim 1, wherein the non-predictable input number K comprises a scratch card number.

20. The apparatus of claim 1, wherein the non-predictable input number K comprises a lottery number.

21. The apparatus of claim 1, wherein the non-predictable input number K comprises data indicative of a playing card.

22. The apparatus of claim 1, wherein the non-predictable input number K comprises data indicative of a bingo number.

23. The apparatus of claim 1, wherein the non-predictable input number K comprises data indicative of output from a roulette wheel.

24. A method for use in a gaming application apparatus, the method comprising:

receiving, by processing circuitry, at a gaming application apparatus a non-predictable input number, K; and operating, by the processing circuitry, a cyclical selector of the gaming application apparatus, the cyclical selector comprising N output options, the operating of the cyclical selector causing the cyclical selector to randomise the positions of the N output options within said cyclical selector prior to receipt of the input number and to cyclically count through said N output options in accordance with the received number K to select one of said N output options, thereby transforming the non-predictable input number K into a selection of an output option for use in the gaming application; and providing a graphical display of the selected output option.

25. The method of claim 24, wherein said selector is arranged to provide a graphical display which is animated to step sequentially through said N output options in accordance with the received number K.

26. The method of claim 24, further comprising receiving a succession of input numbers.

27. The method of claim 26, further comprising outputting an accumulation of output options selected so far by the cyclical selector for a succession of input numbers.

28. The method of claim 24, further comprising randomising the starting position for the cyclical selector in the sequence of N output options prior to receipt of the input number.

29. The method of claim 24, further comprising outputting multiple cyclical selectors, wherein each of said multiple cyclical selectors is configured to receive the input number K and to select a corresponding output option.

30. The method of claim 24, further comprising outputting multiple cyclical selectors arranged in series, wherein the first cyclical selector in the series is configured to receive the input number K, and subsequent cyclical selectors in the series are configured to receive as input the output from an immediately preceding cyclical selector in the series.

31. The method of claim 24, wherein the non-predictable input number is derived from a primary game, and the selected output option is applied to a secondary game.

32. The method of claim 31, wherein said primary game is based on cards.

33. The method of claim 31, wherein said primary game is based on bingo.

34. The method of claim 31, wherein said primary game is based on a casino game.

35. The method of claim 31, wherein said secondary game is based on cards.

36. The method of claim 31, wherein said secondary game is based on bingo.

37. The method of claim 31, wherein said secondary game is based on a casino game.

38. The method of claim 31, wherein said secondary game is based on a comparison of the input number with the selected output option.

39. The method of claim 31, wherein said secondary game is based on a combination of the input number with the selected output option.

40. The method of claim 24, wherein the selected output option corresponds to a potential reward provided by the gaming application.

41. A non-transitory computer-readable storage medium comprising a set of computer-readable instructions stored thereon, which, when executed by a processing system, cause the processing system to carry out a method comprising:

receiving a non-predictable input number, K; and operating a cyclical selector comprising N output options, wherein said cyclical selector is configured to randomise the positions of the N output options within said cyclical selector prior to receipt of the input number and to count through said N randomised output options in accordance with the received number K to select one of said N output options, thereby transforming the non-predictable input number K into a selection of an output option for use in the gaming application; and providing a graphical display of the selected output option.

* * * * *